(12) United States Patent
Pasley

(10) Patent No.: US 6,524,144 B2
(45) Date of Patent: Feb. 25, 2003

(54) SPRING ASSEMBLY FOR TROLLING MOTOR BRACKET

(76) Inventor: B. Phil Pasley, 478 Pennsylvania, Shreveport, LA (US) 71115

( * ) Notice: Subject to any disclaimer, the term of this patent is extended or adjusted under 35 U.S.C. 154(b) by 0 days.

(21) Appl. No.: 10/020,603

(22) Filed: Dec. 18, 2001

(65) Prior Publication Data

US 2002/0102888 A1 Aug. 1, 2002

Related U.S. Application Data

(60) Provisional application No. 60/264,469, filed on Jan. 29, 2001.

(51) Int. Cl.[7] .................................................. B60L 11/02
(52) U.S. Cl. ............................. 440/6; 440/56; 248/640
(58) Field of Search ....................... 440/6, 56; 248/640

(56) References Cited

U.S. PATENT DOCUMENTS

| 3,915,417 | A | 10/1975 | Horton | 248/4 |
| 4,033,530 | A | 7/1977 | Harris | 248/4 |
| 4,555,233 | A | 11/1985 | Klammer et al. | 440/56 |
| 4,734,068 | A | 3/1988 | Edwards | 440/56 |
| 5,116,267 | A | 5/1992 | Olson | 440/56 |
| 5,405,274 | A | 4/1995 | Cook, III | 440/6 |
| 5,607,136 | A | 3/1997 | Bernloehr | 248/640 |

Primary Examiner—Jesus D. Sotelo
(74) Attorney, Agent, or Firm—John M. Harrison

(57) ABSTRACT

A new and improved spring assembly for a trolling motor bracket which is used to mount an electric trolling motor on the deck of a watercraft or boat. The spring assembly includes a rod mount plate for slidably engaging the bracket arm of the trolling motor between first and second positions, and at least one spring operably engages the rod mount plate and biases the rod mount plate in a first position. The mount collar of the trolling motor is adapted for pivotally engaging the rod mount plate of the spring assembly. Accordingly, the rod mount plate slides on the bracket arm from the first position to the second position against bias imparted by the spring or springs, as the mount collar of the trolling motor pivots from a first configuration to a second configuration on the rod mount plate.

10 Claims, 3 Drawing Sheets

SPRING ASSEMBLY FOR TROLLING MOTOR BRACKET

CROSS-REFERENCE TO RELATED APPLICATIONS

This application claims the of copending U.S. Provisional Application Ser. No. 60/264,469, filed Jan. 29, 2001.

BACKGROUND OF THE INVENTION

FIELD OF THE INVENTION

This invention relates to trolling motors and electric trolling motors in particular and more specifically, to a spring assembly for a trolling motor having a bracket arm and a mount collar. The spring assembly includes a rod mount plate for slidably engaging the bracket arm of the trolling motor between first and second positions, and at least one spring operably engages the rod mount plate and biases the rod mount plate in a first position. The mount collar of the trolling motor is adapted for pivotally engaging the rod mount plate of the spring assembly. Accordingly, the rod mount plate slides on the bracket arm from the first position to the second position against bias imparted by the spring or springs, as the mount collar of the trolling motor pivots from a first configuration to a second configuration on the rod mount plate.

One of the problems realized in operating outboard motors such as electric trolling motors is that of striking underwater obstacles and damaging the submerged motor unit or breaking or bending the motor shaft. This problem is especially acute where the motor is used in water body environments having an extensive network of submerged logs, trees, stumps, rocks and other underwater obstacles. The problem is made more severe with the development and use of modern electric trolling motors, since these motors are designed to operate at high thrust, thus increasing boat speed and momentum, with a corresponding tendency for motor damage and bending of the trolling motor shaft upon striking of a submerged object by the motor unit.

Various mounting assemblies and devices are known in the art for cushioning the impact of a submerged motor unit with an underwater obstacle. Among these patents is U.S. Pat. Nos. 3,915,417; 4,033,530; 4,555,233; 4,734,068; 5,116,267; 5,405,274; and 5,607,136.

It is an object of this invention to provide a new and improved spring assembly for a trolling motor bracket that mounts an electric trolling motor on a watercraft or boat, which spring assembly facilitates pivoting of the trolling motor shaft and submerged electric motor with respect to the watercraft or boat in order to prevent damage to the shaft or motor in the event that the submerged portion of the trolling motor strikes an underwater object.

Another object of this invention is to provide a spring assembly for a trolling motor bracket which mounts an electric trolling motor on the deck of a boat or watercraft, which spring assembly facilitates tensioned pivoting of the trolling motor on the bracket in the event that the trolling motor collides with an underwater obstacle, to absorb the impact energy of the collision and thus, prevent bending or breakage of the trolling motor shaft, motor or propeller.

Still another object of this invention is to provide a spring assembly which can be adapted to a trolling motor bracket for facilitating tensioned pivoting of a trolling motor shaft on the trolling motor bracket in the event that the submerged portion of the trolling motor strikes an underwater object, to prevent bending or other damage to the trolling motor shaft or to the submerged electric motor or propeller.

Yet another object of this invention is to provide a spring assembly for a trolling motor bracket such that the shaft of a trolling motor mounted on the bracket pivots against spring tension to prevent damage to the motor in the event that the motor strikes a submerged object.

SUMMARY OF THE INVENTION

These and other objects of the invention are provided in a new and improved spring assembly for a trolling motor bracket which is used to mount an electric trolling motor on the deck of a watercraft or boat. The spring assembly includes a rod mount plate for slidably engaging the bracket arm of the trolling motor between first and second positions, and at least one spring operably engages the rod mount plate and biases the rod mount plate in a first position. The mount collar of the trolling motor is adapted for pivotally engaging the rod mount plate of the spring assembly. Accordingly, the rod mount plate slides on the bracket arm from the first position to the second position against bias imparted by the spring or springs, as the mount collar of the trolling motor pivots from a first configuration to a second configuration on the rod mount plate.

BRIEF DESCRIPTION OF THE DRAWINGS

The invention will be better understood by reference to the accompanying drawings, wherein.

DESCRIPTION OF THE PREFERRED EMBODIMENTS

Figure 3:
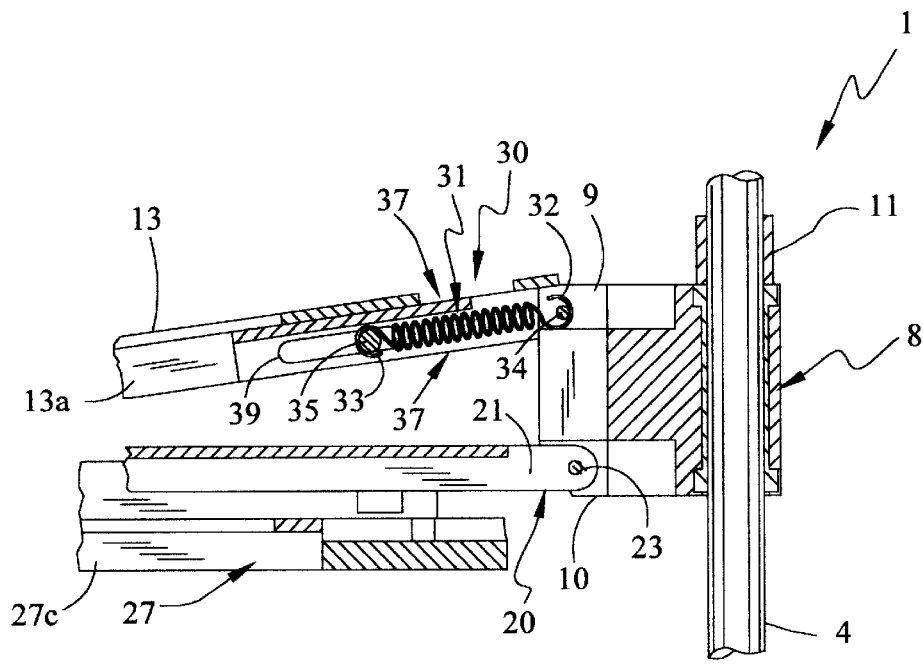
FIG. 3 is a side view, partially in section, of the trolling motor bracket illustrated in FIG. 1, more particularly illustrating a preferred embodiment of the spring assembly of the invention with the trolling motor in normal operating configuration.
Figures 5, 6:
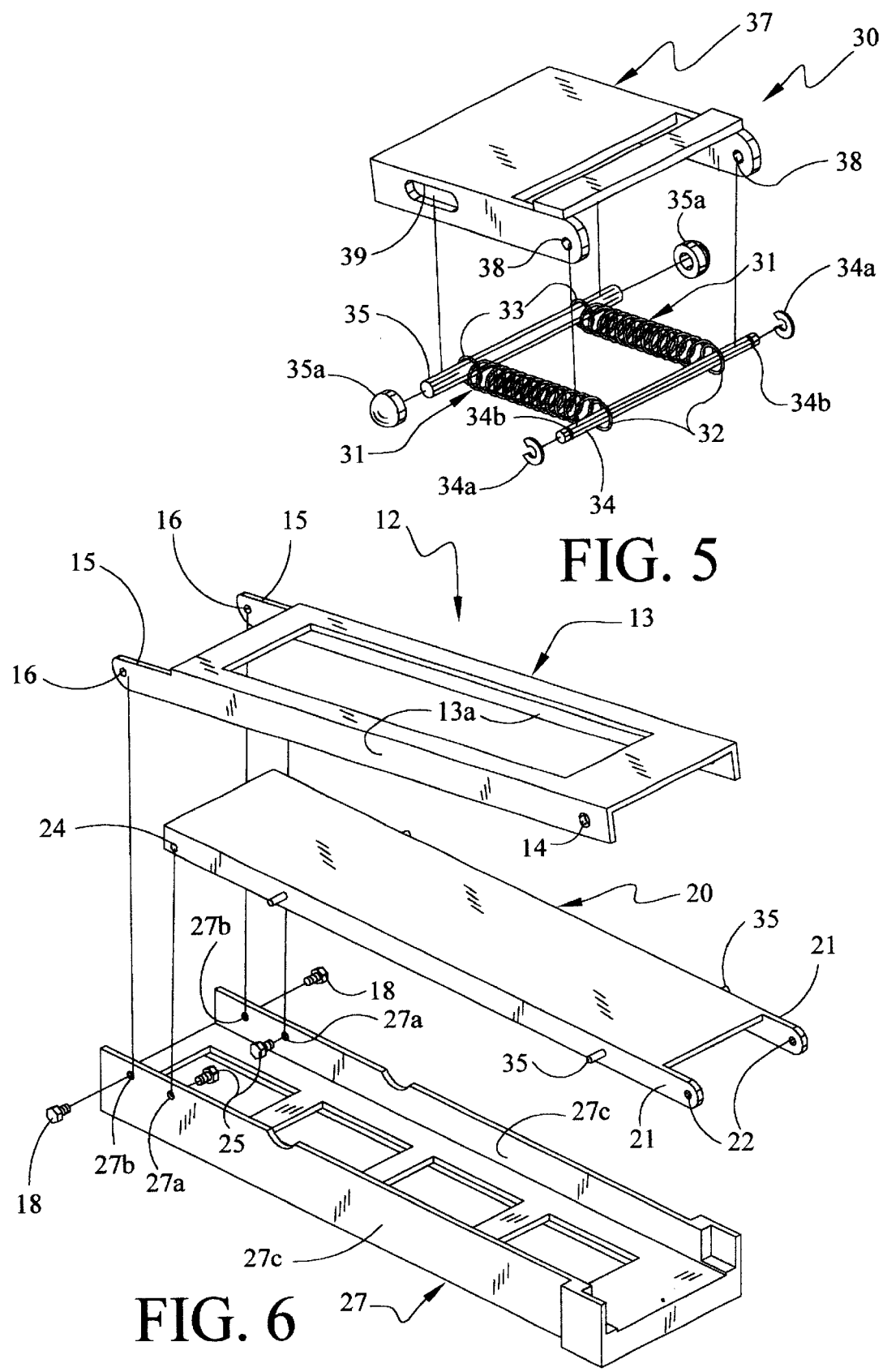
FIG. 5 is an exploded, perspective view of a preferred embodiment of the spring assembly of the invention.
FIG. 6 is an exploded, perspective view of top bracket arm, bottom bracket arm and bracket arm base elements of a typical dual-arm trolling motor bracket to which the spring assembly illustrated in FIG. 5 is typically applied.

Referring initially to FIGS. 1, 3, 5 and 6 of the drawings, in a first preferred embodiment the spring assembly of this invention is generally illustrated by reference numeral 30 in FIGS. 3 and 5 and is designed for attachment to a dual-arm trolling motor bracket 12 that mounts a trolling motor 1 on the deck of a boat 40 (illustrated in phantom in FIG. 1), a typical design of which dual-arm trolling motor bracket 12 is illustrated in exploded view in FIG. 6. The dual-arm trolling motor bracket 12 typically includes a top bracket arm 13, hingedly attached to a bracket arm base 27 by means of a pair of top bracket hinge bolts 18, extending through rear base openings 27b in the bracket arm base 27 and corresponding hinge bolt openings 16 in respective top bracket arm hinges 15 of the top bracket arm 13. A bottom bracket arm 20 is hingedly attached to the bracket arm base 27 by means of a pair of bottom bracket hinge bolts 25, projecting through respective rear base openings 24 in the bottom bracket arm 20 and corresponding front base openings 27a in the bracket arm base 27.

Figure 1:
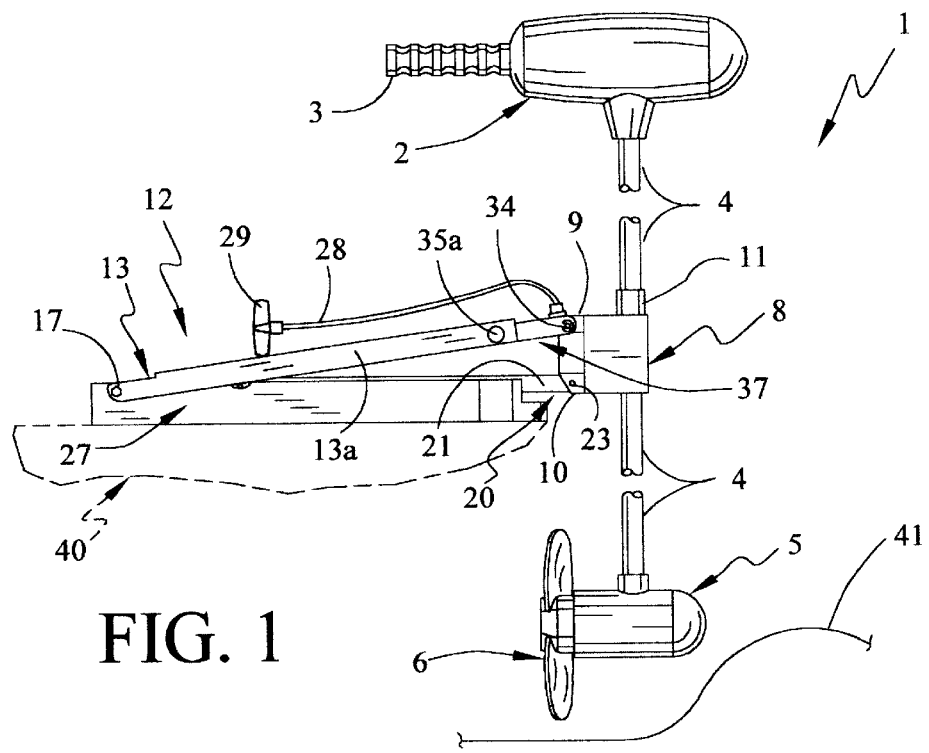
FIG. 1 is a side view of a dual-arm trolling motor bracket, provided on the deck of a boat (in phantom) a fitted with the spring assembly of this invention, with a trolling motor on the bracket positioned in normal operating configuration prior to striking an underwater obstacle.

The spring assembly 30 of this invention includes a slotted rod mount plate 37 which, as illustrated in FIGS. 1 and 3, is pivotally attached to the motor shaft 4 of the electric trolling motor 1 typically by means of a mount collar 8, as hereinafter described. The rod mount plate 37 is fitted inside the parallel bracket arm flanges 13a of the top bracket arm 13 of the dual-arm trolling motor bracket 12. As illustrated in FIG. 5, the spring assembly 30 further includes a pair of spaced-apart, substantially parallel coil springs 31, each having a front spring eye 32 and a rear spring eye 33 and spanning a front spring rod 34 and a rear spring rod 35. The front spring eye 32 of each of the springs 31 engages the front spring rod 34, while the rear spring eye 33 of each spring 31 engages the rear spring rod 35. Engagement of each spring 31 with the front spring rod 34 and rear spring rod 35 is effected before the front spring rod 34 is extended through a pair of aligned, opposing front spring rod openings 38 in the rod mount plate 37 and the rear spring rod 35 is extended through a pair of aligned, opposing rear spring rod slots 39, also provided in the rod mount plate 37, as further illustrated in FIG. 5. The spring assembly 30 is further illustrated in FIG. 3 under circumstances where the trolling motor 1 is in functional operating configuration. When the trolling motor 1 is so operating, it will be appreciated by those skilled in the art that the respective springs 31 are in relaxed configuration, extending between the front spring rod 34 and the rear spring rod 35.

Figure 2:
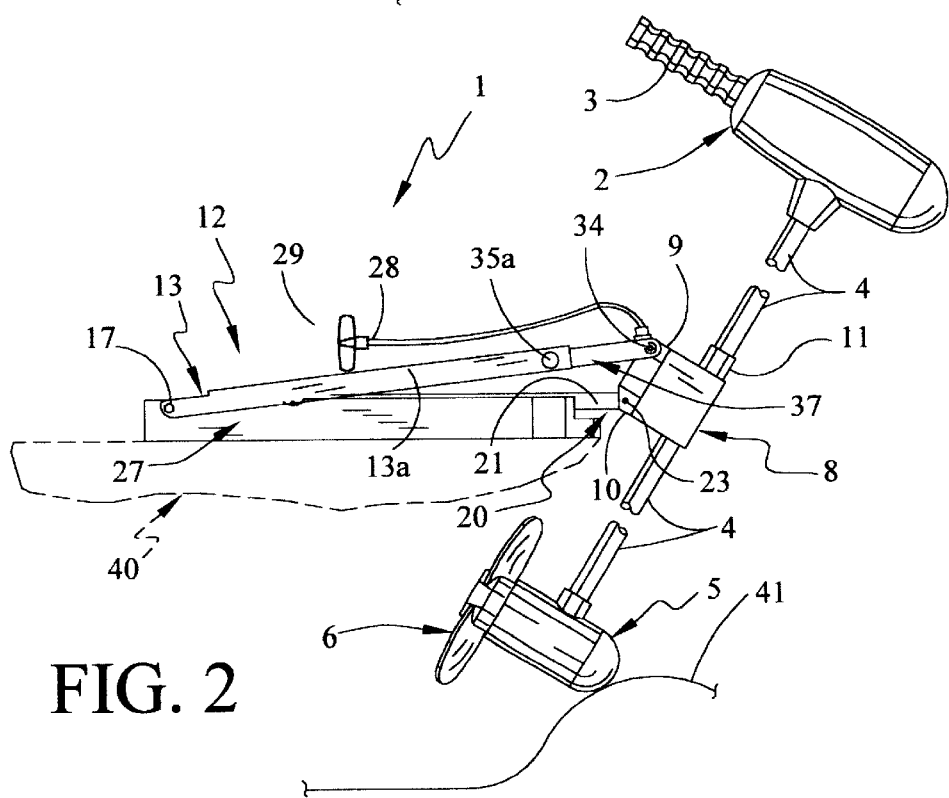
FIG. 2 is a side view of the dual-arm trolling motor bracket and trolling motor illustrated in FIG. 1, wherein the trolling motor is pivoted with respect to the fixed bracket and the boat responsive to striking of an underwater object by the submerged portion of the trolling motor pursuant to operation of the spring assembly.

It will be appreciated from other consideration of FIGS. 1 and 3 of the drawings that the rear spring rod 35 also extends through respective top bracket arm pin openings 14 (FIG. 6) in the top bracket arm 13 of the dual-arm trolling motor mount 12, and, as illustrated in FIG. 5, typically threadably receives a rod retainer 35a on each end thereof Accordingly, while the rear spring rod 35 is immobilized in the parallel rear spring slots 39 while seated in the corresponding spaced-apart top bracket arm pin openings 14, the rod mount plate 37 can slide on the rear spring rod 35 throughout the length of the rear spring rod slots 39 against the tension in the springs 31 pursuant to functioning of the spring assembly 30, as hereinafter further described. As described above, as the front spring rod 34 extends through the front spring rod openings 38 (FIG. 5) in the rod mount plate 37, it also projects through corresponding extension pin openings (not illustrated) in the top mount collar bracket 9 of the mount collar 8, as further illustrated in FIGS. 1 and 3. Accordingly, as further illustrated in FIGS. 1 and 3, the rod mount plate 37 fits inside the downwardly-extending flanges 13a of the top bracket arm 13, and the top bracket arm 13 of the trolling motor bracket 12 and the rod mount plate 37 are pivotally attached to the top mount collar bracket 9 of the mount collar 8 by means of the front spring rod 34. The front spring rod 34 is typically secured in such position by means of a pair of rod clips 34a, seated in corresponding pin grooves 34b (FIG. 5) in the front spring rod 34. The bottom bracket arm extensions 21 of the bottom bracket arm 20 are also pivotally attached to the bottom mount collar bracket 10 of the mount collar 8 by means of extension pins 23, and the bottom bracket arm 20 is seated inside the bracket arm base 27, which is fixed to the deck of the boat 40, illustrated in phantom in FIGS. 1 and 2.

Referring next to FIGS. 1–4 of the drawings, a compression ring 11 is typically provided on the motor shaft 4 of the trolling motor 1, above the mount collar 8 for the purpose of tightening the motor shaft 4 in a selected position in the mount collar 8 and facilitating adjustment of the electric motor 5 in submerged configuration at a selected depth beneath the boat 40. The electric motor 5 of the trolling motor 1 is driven by a propeller 6, and the speed of the propeller 6 is controlled at a steering head 2, typically by means of a twist control at the steering handle 3. A pull cord 28 is attached to the rod mount plate 37 and is fitted with a pull cord handle 29 for lifting the trolling motor 1 into a retracted configuration (not illustrated) on the bracket arm base 27 in conventional fashion.

Figure 4:
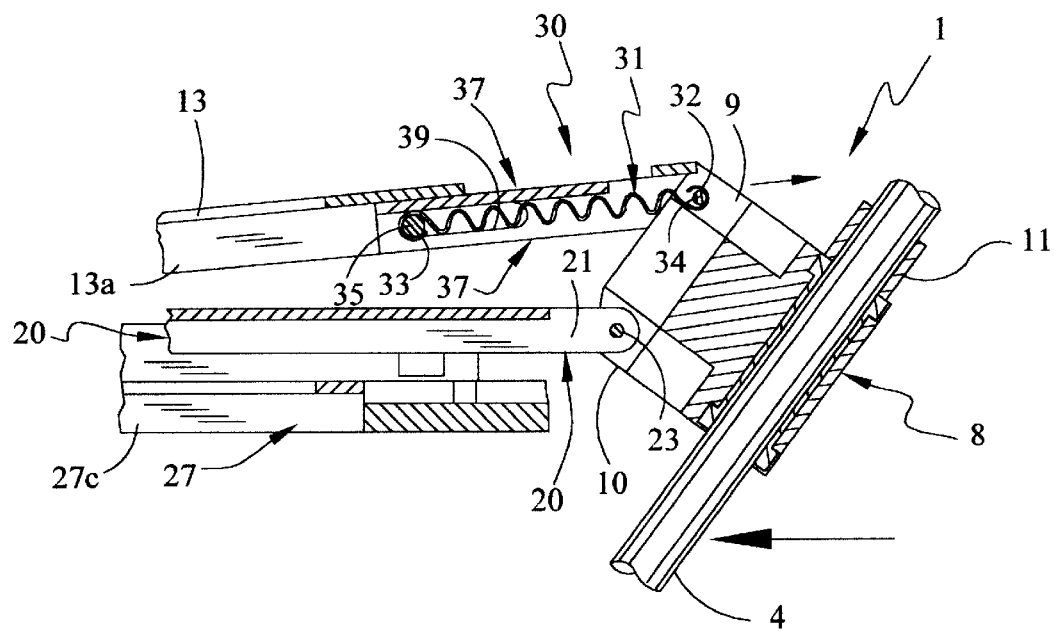
FIG. 4 is a side view, partially in section, of the trolling motor bracket illustrated in FIG. 2, more particularly illustrating operation of the spring assembly when the submerged portion of the trolling motor strikes an underwater obstacle.

Referring again to FIGS. 1–4 of the drawings, under circumstances where the boat 40 travels on a water body (not illustrated) during operation of the trolling motor 1 and the electric motor 5 of the trolling motor 1 collides with a submerged obstruction 41, the mount collar 8 of the motor shaft 4 pivots on the bottom bracket arm 20 of the trolling motor bracket 12 at the extension pins 23. This action causes the top mount collar bracket 9 of the mount collar 8 to pull against the front spring rod 34 as the top mount collar bracket 9 pivots on the rod mount plate 37 at the front spring rod 34. Consequently, the front spring rod 34 pulls the attached rod mount plate 37 forwardly on the stationary rear spring rod 35, along the rear spring rod slots 39, as illustrated in FIG. 4. As the front spring rod 34 simultaneously moves away from the rear spring rod 35, the springs 31 are stretched as further illustrated in FIG. 4. This tensioning of the springs 31 as the mount collar 8 pivots on the trolling motor bracket 12 absorbs most of the impact energy of the collision, thereby preventing bending of the motor shaft 4 and/or damage to the electric motor 5 and/or the propeller 6. As the boat 40 and trolling motor 1 are subsequently maneuvered away from the obstruction 41, the tensioned springs 31 contract and pull the rod mount plate 37 rearwardly on the rear spring rod 35, and the rod mount plate 37 pivots the mount collar 8 and motor shaft 4 to the functional position illustrated in FIGS. 1 and 3.

It will be appreciated by those skilled in the art that the spring assembly 30 illustrated in FIG. 5 can be mounted in many of the existing trolling motor brackets now on the market, particularly those which feature a top bracket arm 13 and a bottom bracket arm 20, the latter of which seats in corresponding bracket arm base 27. However, under circumstance where the trolling motor in question does not have the equivalent of a rod mount plate 37, the rod mount plate 37 illustrated in FIG. 5 can be utilized in the trolling motor bracket 12 as illustrated in FIGS. 3 and 4 to accomplish the result heretofore described.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A spring assembly for a trolling motor having a bracket arm and a mount collar, said spring assembly comprising:
   a rod mount plate for slidably engaging the bracket arm of the trolling motor between first and second positions;

at least one spring operably engaging said rod mount plate for biasing said rod mount plate in said first position;

wherein the mount collar of the trolling motor is adapted for pivotally engaging said rod mount plate; and wherein said rod mount plate slides on the bracket arm from said first position to said second position against bias imparted by said at least one spring, as the mount collar of the trolling motor pivots from a first configuration to a second configuration on said rod mount plate.

2. The spring assembly of claim 1 wherein said at least one spring comprises a pair of springs.

3. A spring assembly for a trolling motor having a bracket arm and a mount collar, said spring assembly comprising:

a rod mount plate for slidably engaging the bracket arm of the trolling motor between first and second positions;

a rear spring anchor for fixed engagement with the bracket arm of the trolling motor;

a front spring anchor fixedly engaging said rod mount plate;

at least one spring engaging said rear spring anchor and said front spring anchor for biasing said rod mount plate in said first position;

wherein the mount collar of the trolling motor is adapted for pivotally engaging said rod mount plate; and wherein said rod mount plate slides on the bracket arm from said first position to said second position against bias imparted by said at least one spring, as the mount collar of the trolling motor pivots from a first configuration to a second configuration on said rod mount plate.

4. The spring assembly of claim 3 wherein said at least one spring comprises a pair of springs.

5. The spring assembly of claim 3 wherein said rear spring anchor comprises a rear spring rod and said front spring anchor comprises a front spring rod.

6. The spring assembly of claim 5 wherein said at least one spring comprises a pair of springs.

7. A spring assembly for a trolling motor having a bracket arm and a mount collar, said spring assembly comprising:

a rod mount plate for slidably engaging the bracket arm of the trolling motor;

wherein the mount collar of the trolling motor is adapted for pivotally engaging said rod mount plate;

a pair of slots provided in said rod mount plate, said pair of slots disposed in spaced-apart, oppositely-disposed relationship with respect to each other;

a rear spring rod slidably disposed in said pair of slots, said rear spring rod adapted for engaging the bracket arm of the trolling motor in fixed relationship;

a front spring rod engaging said rod mount plate; and at least one spring spanning said front spring rod and said rear spring rod, said at least one spring disposed in substantially non-tensioned configuration when the trolling motor is in normal operating position and said at least one spring disposed in tensioned configuration as the mount collar of the trolling motor is pivoted on said rod mount plate and said rod mount plate is displaced on said rear spring rod along said pair of slots when the trolling motor pivots from said normal operating position to an abnormal operating position.

8. The spring assembly of claim 7 comprising rod retainers provided on said front spring rod and said rear spring rod, respectively, for retaining said front spring rod and said rear spring rod in the bracket arm of the trolling motor.

9. The spring assembly of claim 7 wherein said at least one spring comprises a pair of springs.

10. The spring assembly of claim 9 comprising rod retainers provided on said front spring rod and said rear spring rod, respectively, for retaining said front spring rod and said rear spring rod in the bracket arm of the trolling motor.

* * * * *